(12) United States Patent
Packer et al.

(10) Patent No.: US 8,550,326 B2
(45) Date of Patent: Oct. 8, 2013

(54) EXPANDABLE MANDREL FOR USE IN FRICTION STIR WELDING

(75) Inventors: Scott M. Packer, Alpine, UT (US);
Jonathan A. Babb, West Jordan, UT (US); Russell J Steel, Salem, UT (US);
Steve W. Larsen, Payson, UT (US);
Paul T. Higgins, Provo, UT (US)

(73) Assignee: MegaStir Technologies LLC, Provo, UT (US)

(*) Notice: Subject to any disclaimer, the term of this patent is extended or adjusted under 35 U.S.C. 154(b) by 0 days.

(21) Appl. No.: 13/296,601

(22) Filed: Nov. 15, 2011

(65) Prior Publication Data

US 2012/0125973 A1    May 24, 2012

Related U.S. Application Data

(63) Continuation-in-part of application No. 12/694,157, filed on Jan. 26, 2010, now Pat. No. 8,056,797, which is a continuation of application No. 11/244,824, filed on Oct. 5, 2005, now Pat. No. 7,651,018.

(51) Int. Cl.
*B23K 5/22* (2006.01)
*B21B 25/00* (2006.01)

(52) U.S. Cl.
USPC ............. 228/50; 228/44.5; 228/49.3; 269/47; 269/48.1; 269/48.3; 72/462; 72/466; 72/466.2

(58) Field of Classification Search
USPC .......... 228/44.5, 49.3, 50; 269/47, 48.1, 48.2, 269/48.3, 52; 72/462–466.2
See application file for complete search history.

(56) References Cited

U.S. PATENT DOCUMENTS

| | | | |
|---|---|---|---|
| 2,878,770 A | 3/1959 | Work | |
| 3,425,614 A | 2/1969 | Clark | |
| 3,561,320 A | 2/1971 | Nelson et al. | |
| 3,851,519 A | 12/1974 | Calvin | |
| 3,964,290 A | 6/1976 | Auxer | |
| 4,144,110 A | 3/1979 | Luc | |
| 4,201,326 A | 5/1980 | Connell | |
| 4,352,285 A * | 10/1982 | LaRue et al. | 72/466 |
| 4,560,931 A | 12/1985 | Murakami et al. | |
| 5,398,862 A * | 3/1995 | Aleman | 228/49.3 |
| 5,460,317 A | 10/1995 | Thomas et al. | |
| 5,611,479 A | 3/1997 | Rosen | |
| 5,697,511 A | 12/1997 | Bampton | |
| 5,713,507 A | 2/1998 | Holt et al. | |
| 5,718,366 A | 2/1998 | Colligan | |
| 5,758,999 A | 6/1998 | Geise | |
| 5,769,306 A | 6/1998 | Colligan | |
| 5,794,835 A | 8/1998 | Colligan et al. | |
| 5,811,755 A | 9/1998 | McGee | |
| 5,813,592 A | 9/1998 | Midling et al. | |

(Continued)

FOREIGN PATENT DOCUMENTS

| EP | 0 797 043 A2 | 9/1997 |
|---|---|---|
| EP | 0 810 054 A1 | 12/1997 |

(Continued)

*Primary Examiner* — Devang R Patel
(74) *Attorney, Agent, or Firm* — Morriss O'Bryant Compagni, PC (57) ABSTRACT

A mandrel that provides a counter-force to the pressure exerted on the outside of a pipe or other arcuate surface by a friction stir welding tool, wherein the mandrel is expandable through the use of a wedge, and wherein the mandrel enables multiple friction stir welding heads to simultaneously perform welding on the arcuate surface.

11 Claims, 9 Drawing Sheets

(56) References Cited

U.S. PATENT DOCUMENTS

| | | | |
|---|---|---|---|
| 5,829,664 A | 11/1998 | Spinella et al. |
| 5,971,247 A | 10/1999 | Gentry |
| 5,971,252 A | 10/1999 | Rosen et al. |
| 5,975,406 A | 11/1999 | Mahoney et al. |
| 6,045,027 A | 4/2000 | Rosen et al. |
| 6,045,028 A | 4/2000 | Martin et al. |
| 6,050,474 A | 4/2000 | Aota et al. |
| 6,050,475 A | 4/2000 | Kinton et al. |
| 6,051,325 A | 4/2000 | Talwar et al. |
| 6,053,391 A | 4/2000 | Heideman et al. |
| 6,070,784 A | 6/2000 | Holt et al. |
| 6,138,895 A | 10/2000 | Oelgoetz et al. |
| 6,168,066 B1 | 1/2001 | Arbegast |
| 6,168,067 B1 | 1/2001 | Waldron et al. |
| 6,173,880 B1 | 1/2001 | Ding et al. |
| 6,193,137 B1 | 2/2001 | Ezumi et al. |
| 6,206,268 B1 | 3/2001 | Mahoney |
| 6,257,479 B1 | 7/2001 | Litwinski et al. |
| 6,259,052 B1 | 7/2001 | Ding et al. |
| 6,421,578 B1 | 7/2002 | Adams et al. |
| 6,450,395 B1 | 9/2002 | Weeks et al. |
| 6,497,355 B1 | 12/2002 | Ding et al. |
| 6,648,206 B2 | 11/2003 | Nelson et al. |
| 6,726,084 B2 | 4/2004 | Duncan, Jr. |
| 6,779,704 B2 | 8/2004 | Nelson et al. |
| 6,866,181 B2 | 3/2005 | Aota et al. |
| 6,915,943 B2 | 7/2005 | Laing |
| 7,651,018 B2 | 1/2010 | Packer et al. |

FOREIGN PATENT DOCUMENTS

| | | | |
|---|---|---|---|
| EP | 0 867 254 A1 | 9/1998 |
| EP | 0 810 056 A3 | 12/1998 |
| EP | 0 888 843 A1 | 1/1999 |
| EP | 0 925 964 A2 | 6/1999 |
| EP | 0 928 659 A1 | 7/1999 |
| EP | 0 947 280 A1 | 10/1999 |
| EP | 0 968 788 A2 | 1/2000 |
| EP | 0 972 605 A2 | 1/2000 |
| EP | 0 985 483 A2 | 3/2000 |
| EP | 0 992 314 A2 | 4/2000 |
| EP | 1 147 846 A1 | 4/2000 |
| EP | 1 029 627 A1 | 8/2000 |
| EP | 1 046 453 A2 | 10/2000 |
| EP | 1 048 390 A2 | 11/2000 |
| EP | 1 055 478 A1 | 11/2000 |
| EP | 1 057 572 A2 | 12/2000 |
| EP | 1 057 573 A2 | 12/2000 |
| EP | 1 057 574 A2 | 12/2000 |
| EP | 1 057 575 A2 | 12/2000 |
| EP | 1 057 576 A2 | 12/2000 |
| GB | 2 261 623 A | 5/1993 |
| GB | 2 306 366 | 5/1997 |
| JP | 2000-153377 | 6/2000 |
| WO | WO 93/10935 | 6/1993 |
| WO | WO 97/15462 | 5/1997 |
| WO | WO 97/48517 | 12/1997 |
| WO | WO 98/13167 | 4/1998 |
| WO | 98/45080 | 10/1998 |
| WO | WO 98/51441 | 11/1998 |
| WO | WO 98/58759 | 12/1998 |
| WO | WO 99/32254 | 7/1999 |
| WO | WO 99/32255 | 7/1999 |
| WO | WO 99/33594 | 7/1999 |
| WO | WO 99/33597 | 7/1999 |
| WO | WO 99/34951 | 7/1999 |
| WO | WO 99/39861 | 8/1999 |
| WO | WO 99/52669 | 10/1999 |
| WO | WO 99/54081 | 10/1999 |
| WO | WO 99/58288 | 11/1999 |
| WO | WO 99/65637 | 12/1999 |
| WO | WO 00/02698 | 1/2000 |
| WO | WO 00/02699 | 1/2000 |
| WO | WO 00/02704 | 1/2000 |
| WO | WO 00/03818 | 1/2000 |
| WO | WO 00/56497 | 9/2000 |
| WO | WO 01/85385 A1 | 11/2001 |
| WO | WO 02/100586 A1 | 12/2002 |
| WO | WP 2004067218 A2 | 8/2004 |

* cited by examiner

EXPANDABLE MANDREL FOR USE IN FRICTION STIR WELDING

This application claims priority to and incorporates by reference all of the subject matter of U.S. patent application Ser. No. 12/694,157, filed Jan. 26, 2010, which is a Continuation of U.S. patent application Ser. No. 11/244,824, filed, Oct. 5, 2005.

BACKGROUND OF THE INVENTION

1. Field of the Invention

This invention relates generally to friction stir welding. More specifically, the present invention addresses improvements in the ability to perform friction stir welding of pipe or other arcuate objects, wherein a mandrel is needed to provide a counter-balancing force against the inside of the arcuate surface being welded, to thereby prevent a friction stir welding tool in contact with the outside of the arcuate surface from damaging the workpiece being welded.

2. Description of Related Art

Friction stir welding (hereinafter "FSW") is a technology that has been developed for welding metals and metal alloys. The FSW process often involves engaging the material of two adjoining workpieces on either side of a joint by a rotating stir pin or spindle. Force is exerted to urge the spindle and the workpieces together and frictional heating caused by the interaction between the spindle and the workpieces results in plasticization of the material on either side of the joint. The spindle is traversed along the joint, plasticizing material as it advances, and the plasticized material left in the wake of the advancing spindle cools to form a weld.

Figure 1:
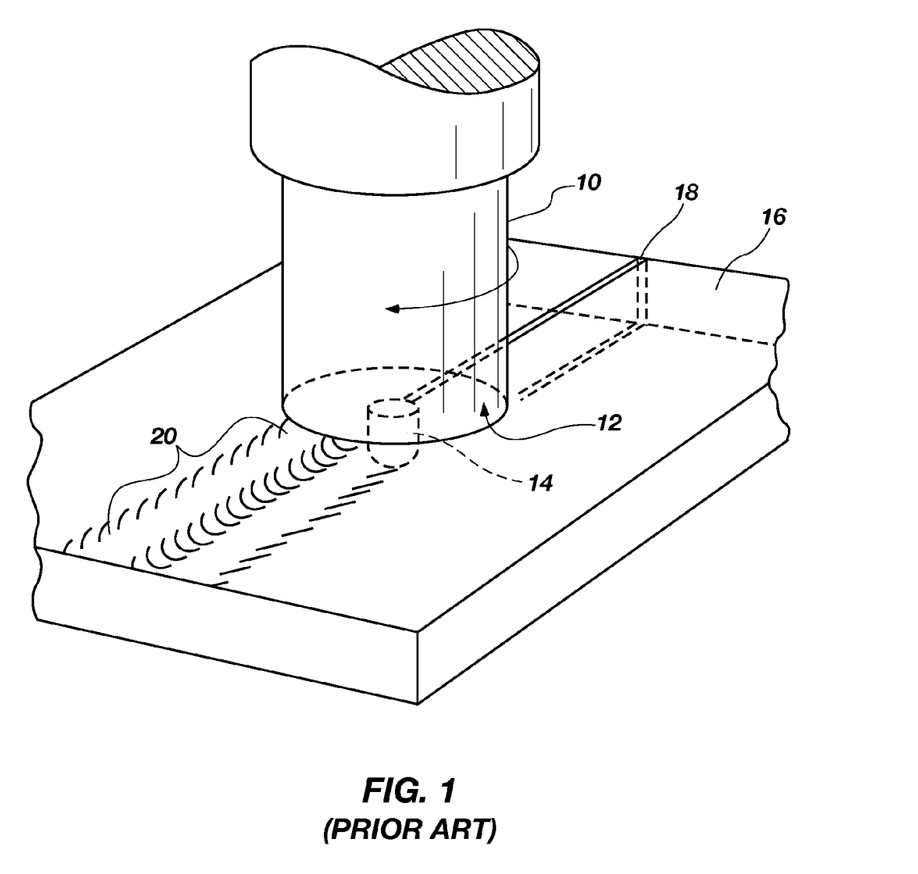
FIG. 1 is a perspective view of a tool as taught in the prior art for friction stir welding.

FIG. 1 is a perspective view of a tool being used for friction stir welding that is characterized by a generally cylindrical tool 10 having a shoulder 12 and a pin 14 extending outward from the shoulder. The pin 14 is rotated against a workpiece 16 until sufficient heat is generated, at which point the pin of the tool is plunged into the plasticized workpiece material. The workpiece 16 is often two sheets or plates of material that are butted together at a joint line 18. The pin 14 is plunged into the workpiece 16 at the joint line 18.

The frictional heat caused by rotational motion of the pin 14 against the workpiece material 16 causes the workpiece material to soften without reaching a melting point. The tool 10 is moved transversely along the joint line 18, thereby creating a weld as the plasticized material flows around the pin from a leading edge to a trailing edge. The result is a solid phase bond 20 at the joint line 18 that may be generally indistinguishable from the workpiece material 16 itself, in comparison to other welds.

It is observed that when the shoulder 12 contacts the surface of the workpieces, its rotation creates additional frictional heat that plasticizes a larger cylindrical column of material around the inserted pin 14. The shoulder 12 provides a forging force that contains the upward metal flow caused by the tool pin 14.

During FSW, the area to be welded and the tool are moved relative to each other such that the tool traverses a desired length of the weld joint. The rotating FSW tool provides a continual hot working action, plasticizing metal within a narrow zone as it moves transversely along the base metal, while transporting metal from the leading face of the pin to its trailing edge. As the weld zone cools, there is typically no solidification as no liquid is created as the tool passes. It is often the case, but not always, that the resulting weld is a defect-free, recrystallized, fine grain microstructure formed in the area of the weld.

Previous patent documents have taught the benefits of being able to perform friction stir welding with materials that were previously considered to be functionally unweldable. Some of these materials are non-fusion weldable, or just difficult to weld at all. These materials include, for example, metal matrix composites, ferrous alloys such as steel and stainless steel, and non-ferrous materials. Another class of materials that were also able to take advantage of friction stir welding is the superalloys. Superalloys can be materials having a higher melting temperature bronze or aluminum, and may have other elements mixed in as well. Some examples of superalloys are nickel, iron-nickel, and cobalt-based alloys generally used at temperatures above 1000 degrees F. Additional elements commonly found in superalloys include, but are not limited to, chromium, molybdenum, tungsten, aluminum, titanium, niobium, tantalum, and rhenium.

It is noted that titanium is also a desirable material to friction stir weld. Titanium is a non-ferrous material, but has a higher melting point than other nonferrous materials.

The previous patents teach that a tool is needed that is formed using a material that has a higher melting temperature than the material being friction stir welded. In some embodiments, a superabrasive was used in the tool.

The embodiments of the present invention are generally concerned with these functionally unweldable materials, as well as the superalloys, and are hereinafter referred to as "high melting temperature" materials throughout this document.

Recent advancements in friction stir welding (FSW) technologies have resulted in tools that can be used to join high melting temperature materials such as steel and stainless steel together during the solid state joining processes of friction stir welding.

Figure 2:
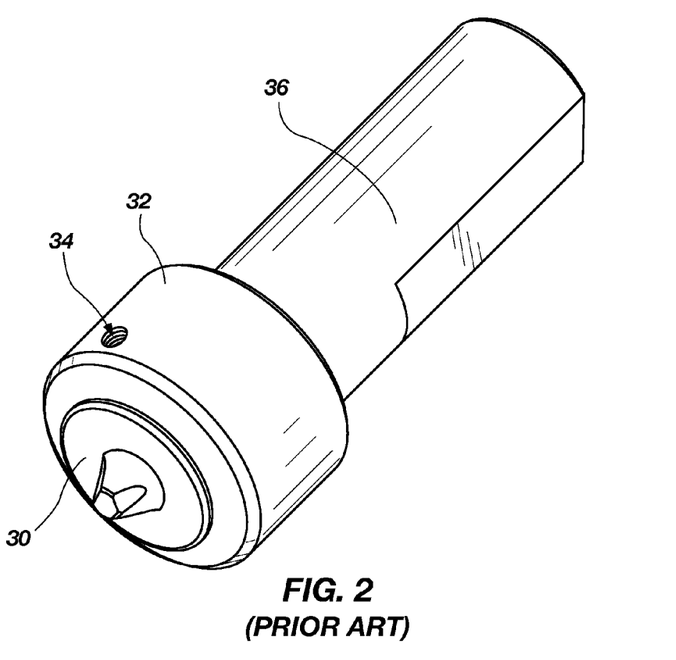
FIG. 2 is a perspective view of a removable polycrystalline cubic boron nitride (PCBN) tip, a locking collar and a shank.

As explained previously, this technology involves using a special friction stir welding tool. FIG. 2 shows a polycrystalline cubic boron nitride (PCBN) tip 30, a locking collar 32, a thermocouple set screw 34 to prevent movement, and a shank 36. Other designs of this tool are also shown in the prior art of the inventors, and include monolithic tools and other designs.

When this special friction stir welding tool is used, it is effective at friction stir welding of various materials. This tool design is also effective when using a variety of tool tip materials besides PCBN and PCD (polycrystalline diamond). Some of these materials include refractories such as tungsten, rhenium, iridium, titanium, molybdenum, etc.

The inventors have been the leader in developing friction stir welding technology for use with high melting temperature alloys such as steel, stainless steel, nickel base alloys, and many other alloys. This technology often requires the use of a Polycrystalline cubic boron nitride tool, a liquid cooled tool holder, a temperature acquisition system, and the proper equipment to have a controlled friction stir welding process.

Figure 3:
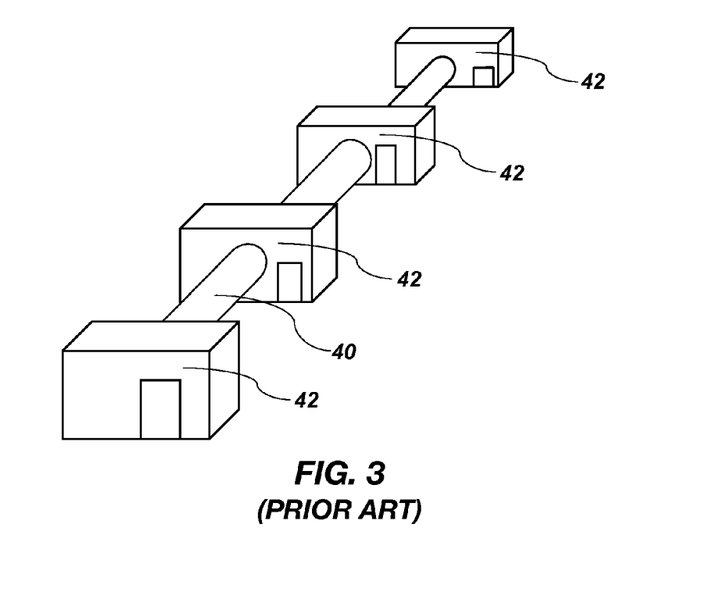
FIG. 3 is a perspective view of a plurality of welding stations that are needed to lay down progressive layers of welding wire to create a fusion welded joint between segments of pipe in the prior art.

Once the technology had been established (current literature indicates the state of the technology) as a superior method for joining these materials, MegaDiamond and Advanced Metal Products (working together as MegaStir Technologies) began searching for applications that would greatly benefit from this technology. One of the largest applications for friction stir welding (FSW) is joining pipe lines. Joining pipe line is extremely costly because of the manpower and equipment needed to weld and move needed components. FIG. 3 shows the manpower and equipment needed to fusion weld a typical pipeline. The pipe 40 is shown with a plurality of welding stations 42 (each of the white enclosures) that are needed to lay down progressive layers of welding wire to create a fusion welded joint between segments of pipe.

Advanced high strength steels (AHSS) are being implemented into pipe lines because less material is needed, higher strength properties are obtained and the total pipeline cost can be lower. The difficulty with AHSS lies in the conventional fusion welding methods being used. It is accepted in the industry that every pipe line joint contains a defect or crack. These defects are accepted because they cannot be eliminated even with sophisticated automated fusion welding systems. Welding AHSS is far more difficult than existing pipe line steels because the material composition inherently causes more fusion welding defects.

Figure 4:
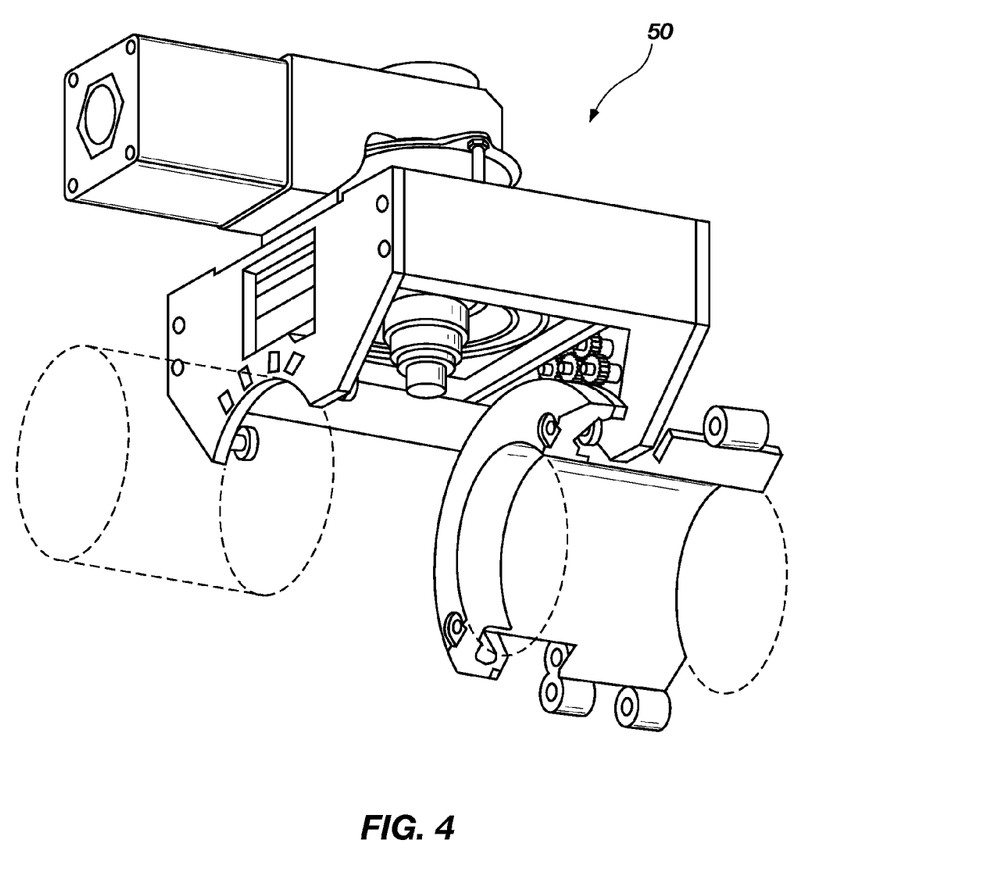
FIG. 4 is a perspective view of a friction stir welding machine that is capable of joining pipe segments.

FSW has now been established as a viable technology to join pipe segments. A friction stir welding machine 50 to join pipe segments has been developed as shown in FIG. 4. A rotating tool plunges into a joint as it creates frictional heat. Once the tool has plunged into the workpiece cross section, the tool is caused to travel circumferentially around the pipes while the joint is "stirred" together. The FSW tool is then retracted and the machine 50 is moved along the pipe to the next pipe joint to be friction stir welded.

Figure 5:
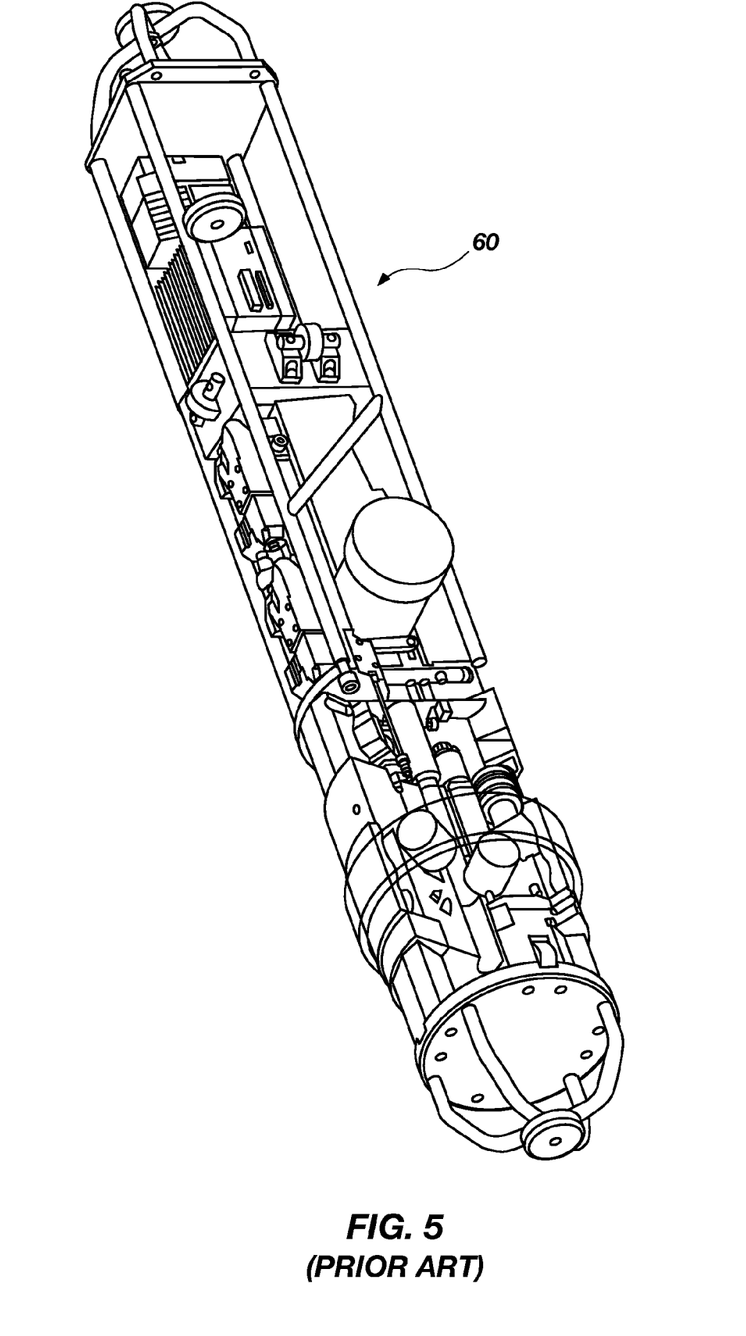
FIG. 5 is a perspective view of a current design of a rotating mandrel "pipe pig" currently being used when friction stir welding pipe.

The friction stir welding machine 50 shown in FIG. 4 illustrates the machine that operates on the exterior of the pipe being welded. One of the requirements of FSW in any form is to have a counter-balancing force on the back side (opposite the tool) of the workpiece being joined. This need arises from the large forces that are applied by the tool against the workpiece. The nature of friction stir welding requires that some support be provided to prevent the workpiece from bending or otherwise being damaged. FIG. 5 shows the current design of a rotating mandrel 60 or "pipe pig" that is currently being used when a friction stir welding pipe.

The mandrel 60 is hydraulically actuated to follow the tool path on the inside of the pipe as the tool follows circumferentially around the pipe joint on the exterior. When the pipe joint is complete, the mandrel 60 is reconfigured so that it can be moved to the next pipe joint. While this mandrel 60 is an effective means to provide support on the opposite side of the tool, the hydraulics and controls are expensive and the construction of the pipe is therefore also costly. A mandrel 60 for FSW of a 12 inch pipe diameter using this design also weighs about 800 lb. This means that moving the mandrel requires additional equipment and support. A further disadvantage is that this mandrel configuration must also have additional hydraulics and rams added to align two pipe segments, further adding to the weight of the mandrel 60. While this design is workable in the field, it would be preferable to have a lighter weight and lower cost mandrel design that can add to the speed and reduce the cost of FSW of a pipeline.

Accordingly, what is needed is a less expensive, less complex, and lightweight pipe pig that can be more easily deployed on-site.

BRIEF SUMMARY OF THE INVENTION

It is an object of the present invention to provide an expandable mandrel that is less complex than those used in the prior art.

It is another object to provide an expandable mandrel that is lighter in weight and therefore easier to use than those used in the prior art.

It is another object to provide an expandable mandrel that can easily move along a length of a pipe in order to reposition itself for use in subsequent friction stir welding operations on-site.

The present invention is a mandrel that provides a counter-balancing force to the pressure exerted on the outside of a pipe or other arcuate surface by a friction stir welding tool, wherein the mandrel is expandable through the use of a wedge, and wherein the mandrel enables multiple friction stir welding heads to simultaneously perform welding on the arcuate surface.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the details of the invention in which the various elements of the present invention will be described and discussed so as to enable one skilled in the art to make and use the invention. It is to be understood that the following description is only exemplary of the principles of the present invention, and should not be viewed as narrowing the claims which follow.

The presently preferred embodiment of the invention is an expandable mandrel for use in friction stir welding operations on arcuate surfaces such as pipe. An expandable mandrel concept was developed that proved to be simple, light weight, and inexpensive. The construction of the mandrel is shown in the following steps.

Figure 6:
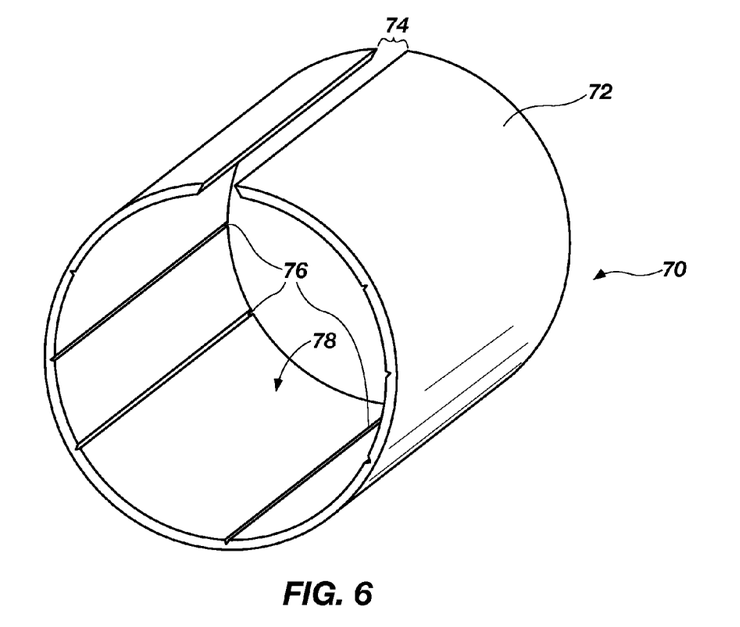
FIG. 6 is a perspective view of a mandrel shell.

FIG. 6 shows a first embodiment of a mandrel shell 72 that forms an outer shell of the mandrel or "pipe pig" 70 of the present invention. The mandrel shell 72 is a hollow cylinder having an opening or gap 74 along the length thereof. The diameter of the mandrel shell 72 is selected so that the mandrel shell will slide inside of the pipe segments (not shown) that are to be welded, when the gap 74 is allowed to close.

Figure 7:
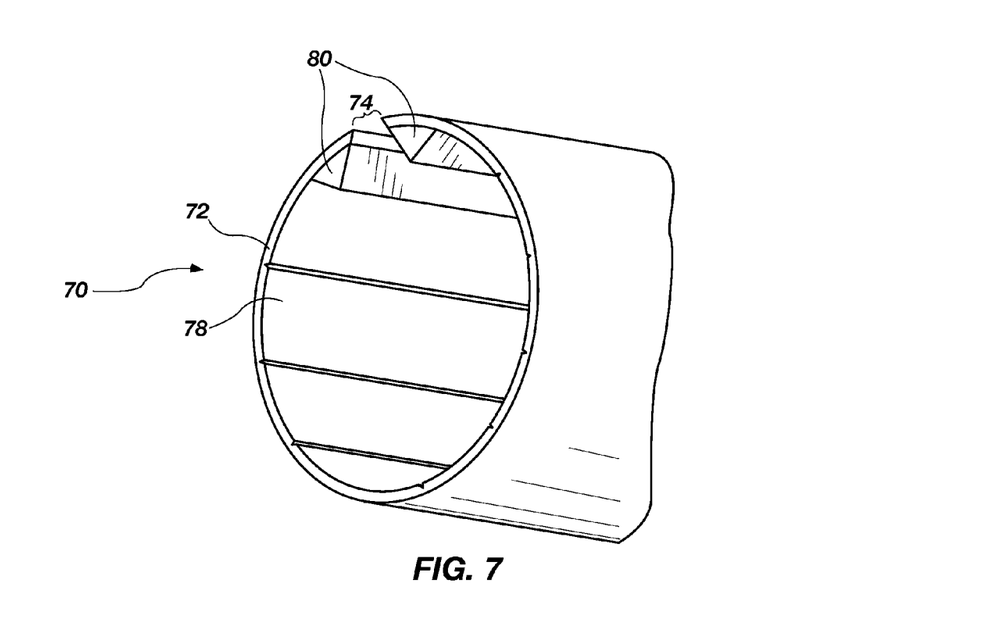
FIG. 7 is a perspective view of a mandrel shell having attached lips for expanding a gap.

FIG. 6 also illustrates relief cuts 76 that are made on the inside diameter 78 of the mandrel shell 72 so that the mandrel shell can spring and flex at the locations of the relief cuts 76. Once the mandrel shell 72 is machined, lips 80 are welded into place on the inside diameter 78 of the mandrel shell 72 immediately adjacent to the gap 74 as shown in FIG. 7.

Once the lips 80 have been welded into place, the mandrel shell 72 is further modified so that the gap 74 is naturally in a closed position when there is no external force being applied to the mandrel shell. This closing of the gap 74 is accomplished by running a fusion weld bead, as is known to those skilled in the art, parallel to the length of the relief cuts 76, and in equiangular positions relative to each other. In other words, enough weld beads are disposed on the inside of the mandrel shell 72 in uniform locations to distort the mandrel shell so that the gap 74 is closed as a result of the residual stresses caused by the solidifying weld beads. Thus, the mandrel shell 72 now springs back to a closed position if the gap 74 is forced apart.

Figure 8:
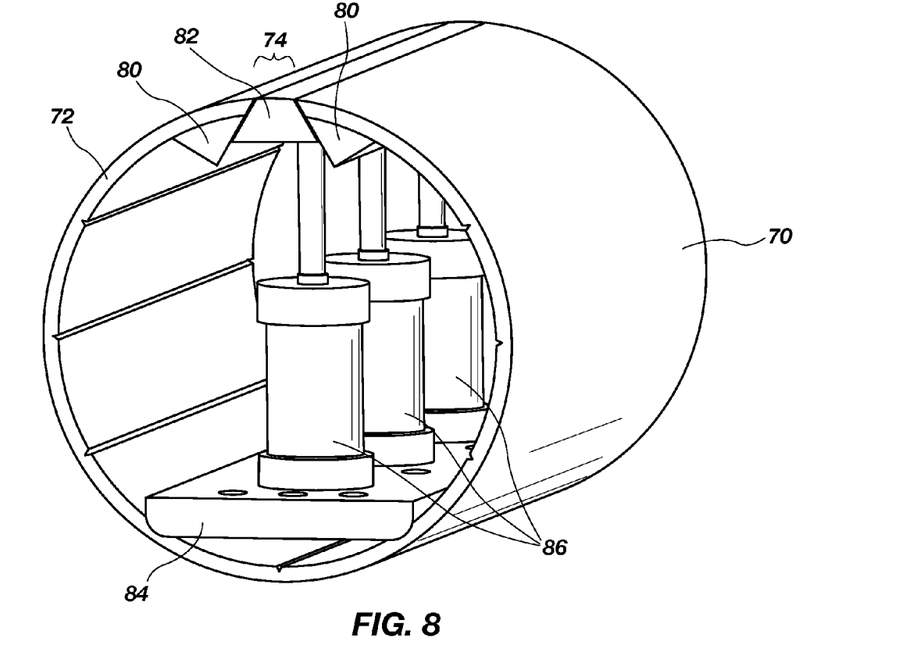
FIG. 8 is a perspective view of a mandrel shell showing the means for expanding the gap in the mandrel shell.

In FIG. 8, the next component of the pipe pig 70 is to provide a mechanism whereby the mandrel shell 72 can be caused to expand and open the gap 74 when needed. Accordingly, an expanding wedge 82 is provided so that it can be inserted between the lips 80 of the mandrel shell 72. Note that the angle of the expanding wedge 82 that makes contact with the lips 80 is constructed to easily allow the expanding wedge to move upwards into the gap 74, and thereby cause the gap to continue to widen as long as the expanding wedge can be pushed against the lips 80.

Expansion of the mandrel shell 72 stops when the expanding wedge 82 makes contact with the inside of a pipe, or when the outside diameter of the mandrel shell 72 can no longer expand outwards against the inside diameter of a pipe.

FIG. 8 also illustrates a platform or plate 84, and a plurality of hydraulic cylinders 86 that are disposed on the plate. The hydraulic cylinders 86 push against the plate 84 and the expandable wedge 82 to cause the expandable wedge to move upwards into the gap 74. It is envisioned that the bottom of the hydraulic cylinders 86 could also be modified so as to fit the inside of the mandrel shell 72. However, as the mandrel shall is designed to expand and contract, the bottom of the hydraulic cylinders 86 would need to be able to compensate for the shift in shape.

It should be noted that a single hydraulic cylinder 86 could be used in place of the plurality of hydraulic cylinders being shown. Furthermore, the length of the mandrel shell 72, the lips 80, the expandable wedge 82, and the plate 84 can all be modified depending upon the required application. Thus, a system that is smaller in length may be useful in applications where the space or length of horizontal sections within a pipe are restricted.

Similarly, the length of the components listed above might be expanded to enable multiple tools to simultaneously be used to perform friction stir welding on a pipe while the pipe is supported by the single pipe pig 70.

Figure 9:
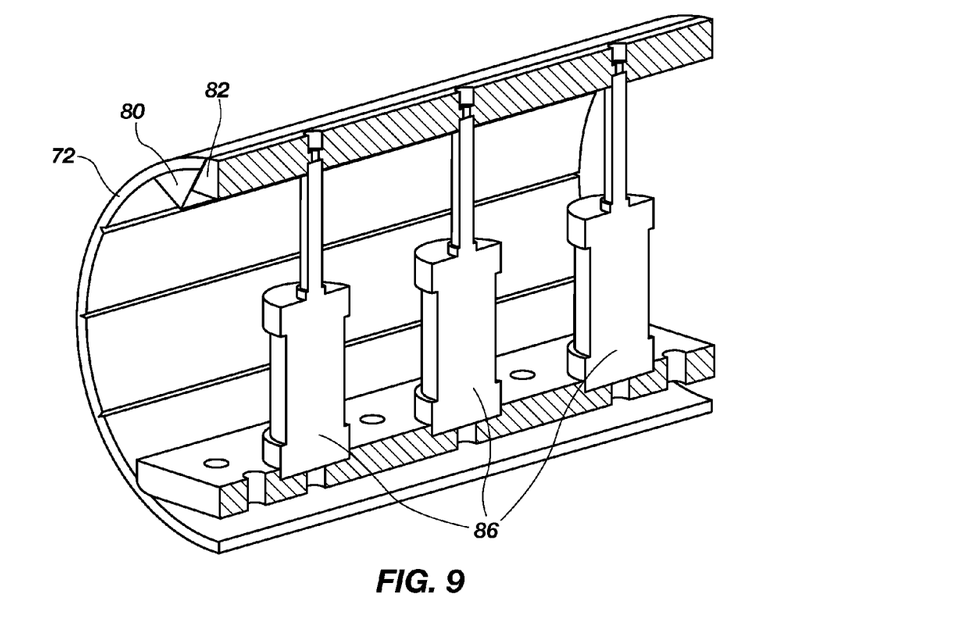
FIG. 9 is a cross-sectional perspective view of a mandrel shell and the means for expanding the gap in the mandrel shell.
Figure 10:
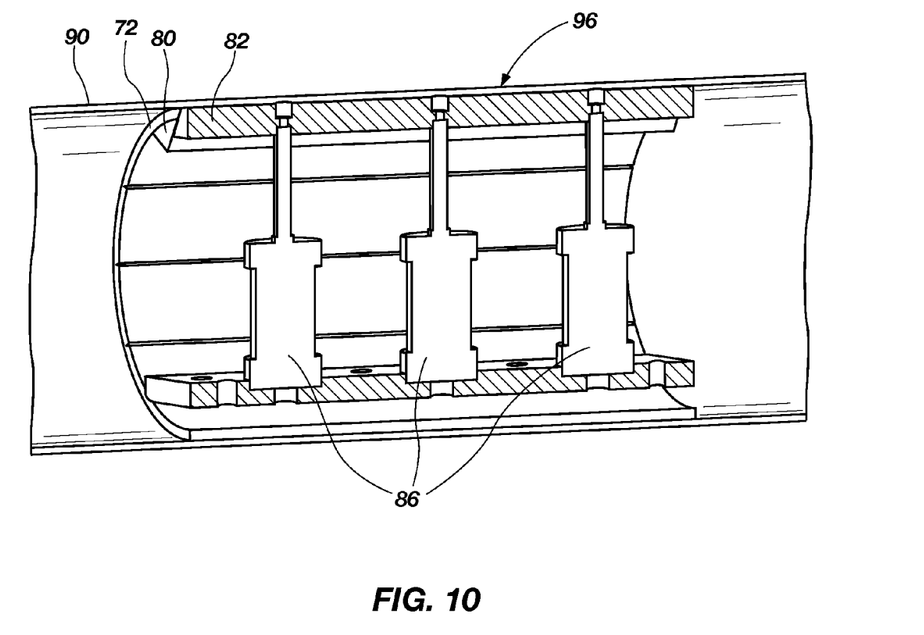
FIG. 10 is a cross-sectional perspective view of a mandrel shell and the means for expanding the gap in the mandrel shell, disposed inside a pipe.

FIGS. 9 and 10 show how the expanding wedge 82 is positioned to slide outwards through the lips 80 of the mandrel shell 72 if the gap 74 is large enough to accommodate the expanding wedge when the gap is as wide as it can be. FIG. 9 is a cross-sectional view of the invention that also shows the hydraulic cylinders 86 in cross-section. FIG. 10 is a cross-sectional view that shows all the elements shown in FIG. 9, but with the addition of a pipe 90. This figure also shows a joint 96 that is the seam between the pipes being friction stir welded.

FIG. 10 shows the expanding wedge 82 fully inserted between the lips 80. When hydraulic pressure is removed from the hydraulic cylinders 86, the mandrel shell 72 retracts and the mandrel shell springs closed. The mandrel shell 72 can now be moved to a different location within the pipe 90. The mandrel shell 72 is moved to the next pipe joint where it is expanded. Hydraulic hoses and fittings that lead to the hydraulic cylinders 86 are not shown. However, these hoses and fittings are disposed on an end of the mandrel shell 72 so that they are coupled to the hydraulic cylinders 86.

It is noted that not only does the pipe pig 70 provide the counter-balancing force necessary for friction stir welding of the pipe 90, but it can also function to further align the segments of the pipe 90

It is also noted that the plate 84 that supports the hydraulic cylinders 86 is coupled to the mandrel shell 72 so the expanding wedge 82 can be retracted from the gap 74 instead of lifting the plate.

The following are modifications that can be made to the mandrel shell 72 design above that can enhance the operation of the pipe pig 70. For example, holes can be machined through the mandrel shell 72 so that air can flow through the holes when the mandrel shell is collapsed. This creates an "air bearing" on the bottom of the mandrel shell 72 so that one person can easily slide the pipe pig 70 to the next pipe joint that is to be friction stir welded.

Another aspect of the invention is that quick disconnects can be used on the hydraulic hoses that are coupled to the hydraulic cylinders 86 so that the hoses can be quickly disconnected and reconnected when the pipe pig 70 is re-positioned at a next pipe joint.

In another aspect of the invention, a variety of materials can be used to construct the mandrel shell 72. Spring steel could be used to always maintain the relaxed closed position of the mandrel shell 72. The material must always be in the elastic region and not be easily stress relieved. This way, the mandrel shell 72 will always keep its shape. If the mandrel shell does start to lose its shape and spring outward when in a relaxed position so that the gap 74 is visible, more welding beads can be run along the length of the inside diameter to restore the residual stresses that cause the mandrel shell 72 to close.

Another aspect of the invention is that expanding wedges can be made in different sizes to compensate for different tolerances of pipe segments.

Another aspect of the invention is that coatings (TiN, TiCN, etc.) can be used on an outer surface of the mandrel shell 72 to thereby prevent the pipe joint from diffusion welding to the mandrel shell during friction stir welding.

Another aspect of the invention is that the invention can be used for any diameter pipe.

It is noted that a rod is attached (not shown) that feeds hydraulic hoses through the next section of pipe.

Figure 11:
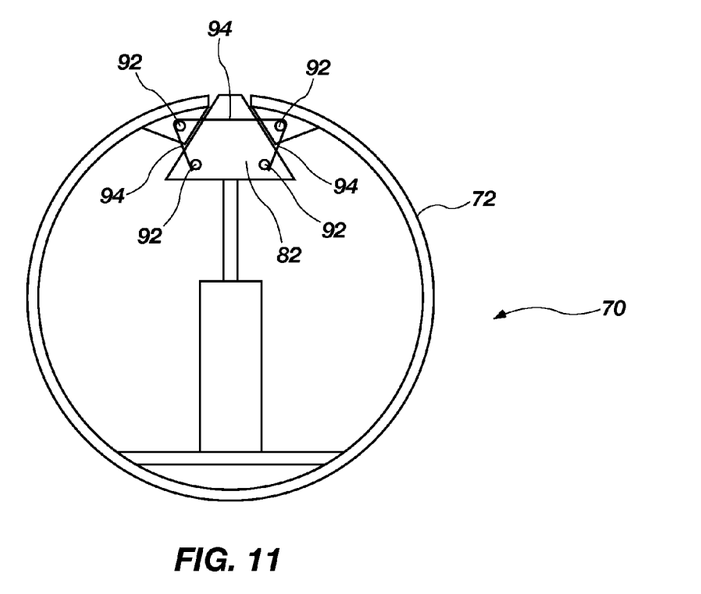
FIG. 11 is an end view of a mandrel shell showing a system of cable and pins for closing the gap when the expanding wedge is retracted.

Another aspect of the present invention has to do with a means for pulling the mandrel shell 72 closed when in a relaxed position. As shown in FIG. 11, the expanding wedge 82 can include posts or pins 92 and a cable 94 disposed therebetween. The cable 94 is run around a pin 92 on both lips 80 of the mandrel shell 72. When the expanding wedge 82 is retracted, the cable 94 performs the function of pulling on the two lips 80 so that they are forced to come together and close the gap 74. It is anticipated that this system of pins 92 and cable 94 can be disposed on both ends of the mandrel shell 72 if needed.

Figure 12:
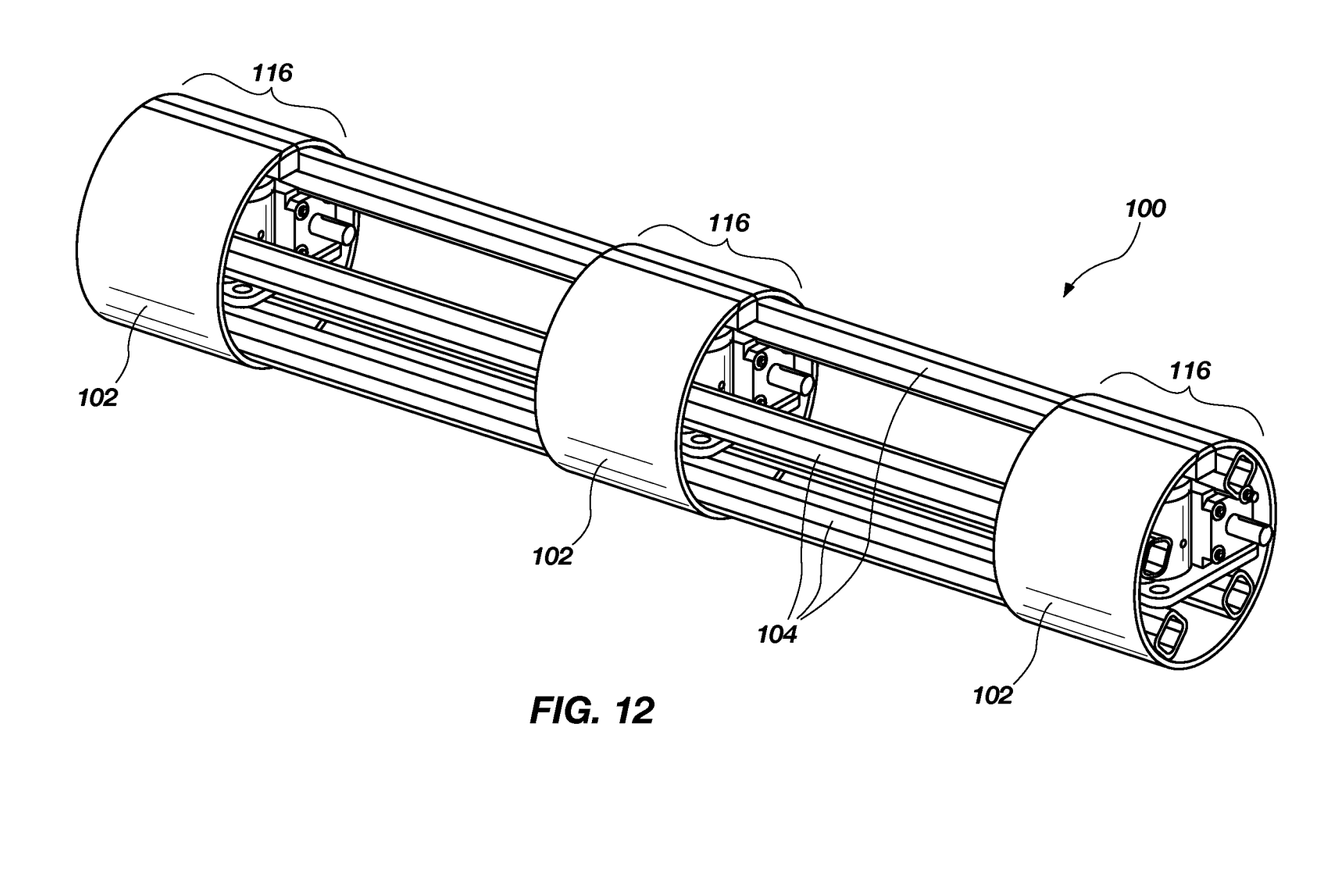
FIG. 12 is a perspective view of an alternative embodiment of the expandable mandrel shell shown in FIGS. 6 through 11.

FIG. 12 is an alternative embodiment of the present invention that has some advantages over the pipe pig 70 shown in FIGS. 6 through 11. In this alternative embodiment, the expandable mandrel shell 102 of the mandrel 100 is no longer the entire length of the mandrel. By making the expandable mandrel shell 102 in sections or segments, the overall weight of the mandrel 100 is significantly reduced. Thus, the mandrel 100 of the present invention is now comprised of a series of expanding mandrel shell stations 116 that are all coupled to a plurality of tubing struts 104 that form a central axis of the mandrel 100. The total number of expanding mandrel shell stations 116 that can be used in a single mandrel 100 is not limited to two. FIG. 12 shows three expanding mandrel shell stations 116, but this number can be modified as desired.

Figure 13:
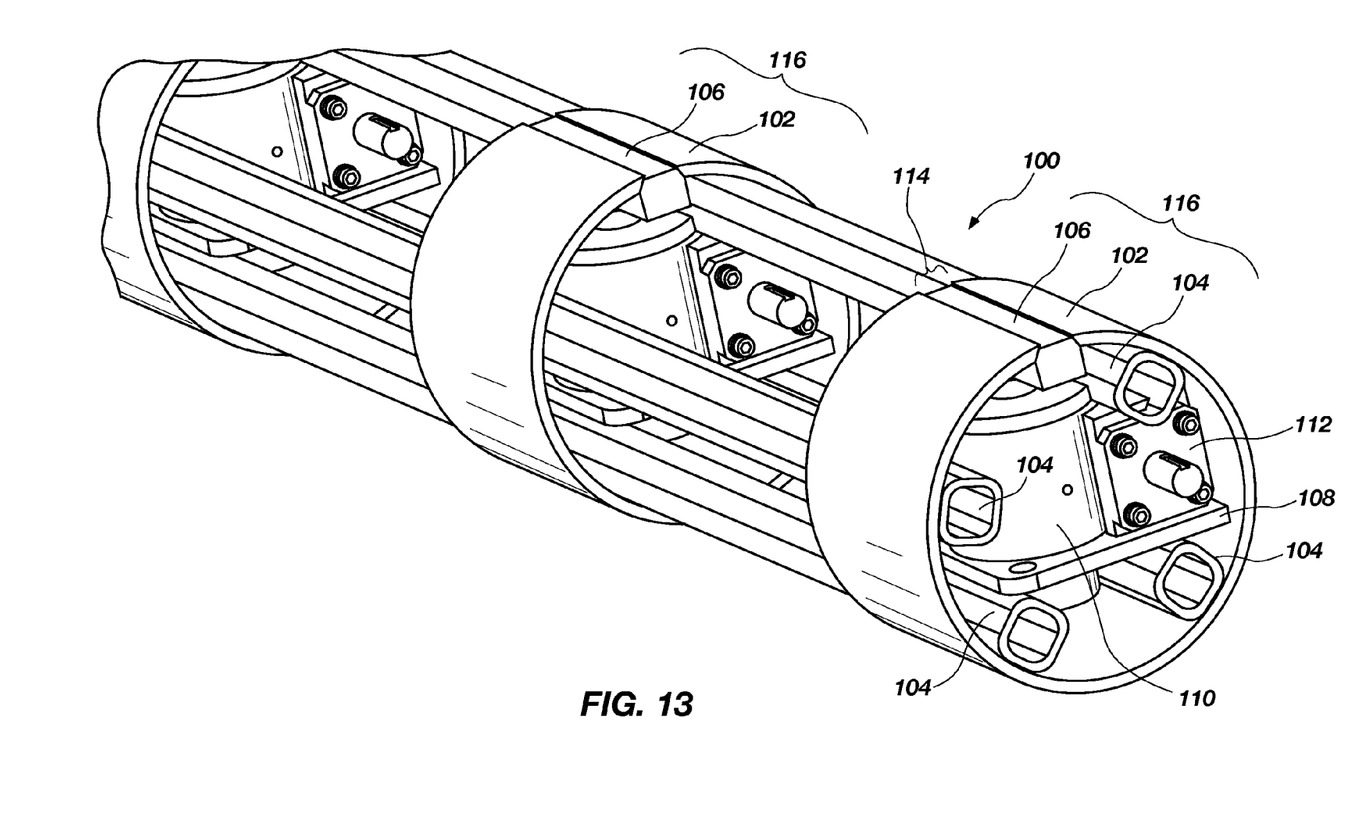
FIG. 13 is a close-up perspective view of the expandable mandrel shell stations shown in FIG. 12.

Another means of reducing overall weight of the mandrel 100 is shown in FIG. 13. FIG. 13 shows that the tubing struts 104 are hollow. The tubing struts 104 are coupled to a platform 108 and/or to the items on the platform on which a means for forcing the expanding wedges 106 into the expandable mandrel shells 102 is disposed. The means for forcing the expanding wedges 106 upwards into the expandable mandrel shells 102 can be any servo/mechanical or hydraulic system. In FIG. 13, a servo/mechanical system includes a piston 110 and a screw jack 112. A hydraulic system would include a similar piston and a means for forcing a hydraulic fluid into the piston.

An advantage of this alternative embodiment is that each of the expandable mandrel shells 102 is now replaceable. The purpose for replacing shell segments is to enable the mandrel 100 to be usable in larger or smaller diameter pipes. When working in a large diameter pipe, a spacer block (not shown) can be disposed between the tubing struts 104 and the expandable mandrel shell 102 segments, allowing the expanding wedge 106 to expand an expandable mandrel shell of a larger diameter. Thus the mandrel 100 is more versatile, and only limited by the smallest pipe that the mandrel 100 can fit into.

The expanding wedge 106 can also be replaced so that the expanding wedge can properly expand to match any diameter of an expandable mandrel shell 102.

The expandable mandrel shells 102 can include all of the features previously described, including the plurality of relief cuts that will cause the expandable mandrel shells to contract when not being forced apart by the wedges 106. Furthermore, the expandable mandrel shell 102 can also include fusion weld beads parallel to the gap and spaced equidistantly from each other in the shell to cause the desired residual stresses that cause the shells to contract when force is not being applied. In addition, a material can also be used on the expandable mandrel shells 102 that prevents diffusion bonding with the inner diameter of the pipe.

Lips can also be disposed on the expandable mandrel shells to give the expanding wedge 106 something to push against other than the shell itself. Furthermore, the previously described peg and cable system can also be used to forcibly cause the gap 114 in the expandable mandrel shell 103 to close when the expanding wedge 106 is retracted.

A typical mandrel 100 will have at least two expandable mandrel shell stations 116, each of the expandable mandrel shell stations having a platform 108, and a means 110 and 112 for driving the expanding wedge 106 into the gap 114 in each of the expandable mandrel shells 102.

It is noted that each expanding mandrel shell station 116 could actually expand to a different diameter than the other stations if the pipe in which it was being used also changed diameter. This would allow the mandrel 100 to be more securely positioned within the pipe.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A mandrel for use in friction stir welding of a pipe, said mandrel comprising:
   a plurality of hollow tubes; and
   at least two expandable mandrel shell stations coupled to the plurality of hollow tubes, each station separated from another by a station gap, and each station comprised of:
   a platform coupled to the plurality of hollow tubes;
   an expandable mandrel shell formed as a hollow cylinder having an outer diameter that is smaller than an inner diameter of the pipe, wherein the plurality of hollow tubes are coupled to the expandable mandrel shell, and wherein the expandable mandrel is disposed directly against a seam in a pipe in order to provide a force on an inside diameter that counteracts a force applied by a friction stir welding tool moving along the seam on an outside diameter of the pipe;
   wherein the expandable mandrel shell has a gap into which an expanding wedge is inserted, the expandable mandrel shell having two lips, each lip disposed adjacent to and on either side of the gap;
   a means for coupling edges surrounding the gap to the expandable wedge, wherein retracting the expandable wedge from the gap causes the edges surrounding the gap to move toward each other;
   a first and a second post disposed in first ends of the lips;
   a third and fourth post disposed in a first end of the expandable wedge; and
   a cable coupled to the third and fourth posts, and disposed around the first and second posts, wherein retracting the expandable wedge from the gap causes the cable to close the gap in the expandable mandrel shell; and
   a means for expanding the expandable mandrel shell by pushing the expanding wedge into the gap such that the gap widens to a desired width, the means being disposed on the platform.

2. The mandrel as defined in claim 1 wherein the means for expanding the mandrel shell further comprises at least one hydraulic actuation device coupled to the expanding wedge and disposed so as to widen the gap when the at least one hydraulic actuation device is actuated.

3. The mandrel as defined in claim 1 wherein the means for expanding the mandrel shell further comprises:
   at least one servo/mechanical device coupled to the expanding wedge and disposed so as to widen the gap when the at least one servo/mechanical device is actuated.

4. The mandrel as defined in claim 1 wherein the mandrel is further comprised of a plurality of relief cuts in the inside diameter of the expandable mandrel shell, wherein the relief cuts are perpendicular to the top and bottom edges of the expandable mandrel shell.

5. The mandrel as defined in claim 1 wherein each of the lips is tapered away from each other and the gap.

6. The mandrel as defined in claim 1 wherein the gap in the expandable mandrel shell is closed when the expandable mandrel shell is at rest.

7. The mandrel as defined in claim 6 wherein the expandable mandrel shell has residual stresses that cause the expandable mandrel shell to be closed at the gap.

8. The mandrel as defined in claim 7 wherein the residual stresses are created by disposing a plurality of fusion weld beads parallel to the gap and spaced equidistantly from each other in the mandrel shell.

9. The mandrel as defined in claim 3 wherein the size of the expanding wedge can be modified so as to cause the mandrel to expand more when a larger expanding wedge is used, and to cause the expanding mandrel shell to expand to a lesser degree when a smaller expanding wedge is used, to thereby accommodate different diameter pipes using the same expandable mandrel shell.

10. The mandrel as defined in claim 1 wherein an outer diameter of the expandable mandrel shell is coated with a material to prevent a pipe from diffusion bonding to the expandable mandrel shell during friction stir welding of the pipe.

11. A mandrel for use in friction stir welding of a pipe, said mandrel comprising:
  a plurality of expandable mandrel shell stations that are separated from each other along a central axis, and wherein each expandable mandrel shell station is comprised of:
    a platform;
    an expandable mandrel shell formed as a hollow cylinder around the platform and having an outer diameter that is smaller than an inner diameter of the pipe, wherein the expandable mandrel shell has a gap into which an expanding wedge is inserted, and wherein the expandable mandrel is disposed directly against a seam in a pipe in order to provide a force on an inside diameter that counteracts a force applied by a friction stir welding tool moving along the seam on an outside diameter of the pipe; and
    a means for expanding the expandable mandrel shell by pushing the expanding wedge into the gap such that the gap widens to a desired width, the means being disposed on the platform, the expandable mandrel shell having two lips, each lip disposed adjacent to and on either side of the gap;
    a means for coupling edges surrounding the gap to the expandable wedge, wherein retracting the expandable wedge from the gap causes the edges surrounding the gap to move toward each other;
    a first and a second post disposed in first ends of the lips;
    a third and fourth post disposed in a first end of the expandable wedge; and
    a cable coupled to the third and fourth posts, and disposed around the first and second posts, wherein retracting the expandable wedge from the gap causes the cable to close the gap in the expandable mandrel shell; and
  a plurality of struts disposed along the central axis and coupled to the platform of each of the expandable mandrel shell stations.

* * * * *